(12) United States Patent
Raue et al.

(10) Patent No.: US 9,975,316 B2
(45) Date of Patent: May 22, 2018

(54) MULTILAYERED COEXTRUDED THERMOPLASTIC FOOD CASING

(71) Applicant: Viscofan S.A., Tajonar (Navarra) (ES)

(72) Inventors: Frank Raue, Karlsruhe (DE); Marek Bouma, Zliv (CZ)

(73) Assignee: Viscofan S.A., Tajonar (Navarra) (ES)

( * ) Notice: Subject to any disclaimer, the term of this patent is extended or adjusted under 35 U.S.C. 154(b) by 78 days.

(21) Appl. No.: 14/918,634

(22) Filed: Oct. 21, 2015

(65) Prior Publication Data

US 2016/0114557 A1     Apr. 28, 2016

(30) Foreign Application Priority Data

Oct. 27, 2014 (EP) ..................... 14190496

(51) Int. Cl.
| | | |
|---|---|---|
| B32B 27/18 | (2006.01) | |
| B32B 5/18 | (2006.01) | |
| B32B 27/06 | (2006.01) | |
| B32B 7/12 | (2006.01) | |
| B32B 27/20 | (2006.01) | |
| B32B 27/32 | (2006.01) | |
| B32B 27/34 | (2006.01) | |
| B29C 47/06 | (2006.01) | |
| B29C 47/00 | (2006.01) | |
| B65D 65/38 | (2006.01) | |
| B65D 85/08 | (2006.01) | |
| B32B 1/02 | (2006.01) | |
| B29C 44/34 | (2006.01) | |
| B32B 5/20 | (2006.01) | |
| B32B 27/08 | (2006.01) | |
| B32B 27/30 | (2006.01) | |
| B32B 27/36 | (2006.01) | |
| B32B 1/08 | (2006.01) | |

(Continued)

(52) U.S. Cl.
CPC .......... *B32B 27/18* (2013.01); *A22C 13/0013* (2013.01); *B29C 44/3469* (2013.01); *B29C 47/0021* (2013.01); *B29C 47/0042* (2013.01); *B29C 47/06* (2013.01); *B32B 1/02* (2013.01); *B32B 1/08* (2013.01); *B32B 3/26* (2013.01); *B32B 5/18* (2013.01); *B32B 5/20* (2013.01); *B32B 7/12* (2013.01); *B32B 27/065* (2013.01); *B32B 27/08* (2013.01); *B32B 27/20* (2013.01); *B32B 27/205* (2013.01); *B32B 27/304* (2013.01); *B32B 27/306* (2013.01); *B32B 27/308* (2013.01); *B32B 27/32* (2013.01); *B32B 27/327* (2013.01); *B32B 27/34* (2013.01); *B32B 27/36* (2013.01); *B65D 65/38* (2013.01); *B65D 85/08* (2013.01); *A22C 2013/004* (2013.01); *A22C 2013/0023* (2013.01); *A22C 2013/0046* (2013.01); *A22C 2013/0053* (2013.01); *A22C 2013/0059* (2013.01); *B29K 2023/00* (2013.01); *B29K 2077/00* (2013.01); *B29K 2105/04* (2013.01); *B29K 2995/0067* (2013.01); *B29K 2995/0092* (2013.01); *B29L 2007/00* (2013.01); *B29L 2009/00* (2013.01); *B29L 2031/7162* (2013.01); *B32B 2266/025* (2013.01); *B32B 2266/0214* (2013.01); *B32B 2266/0228* (2013.01); *B32B 2266/0235* (2013.01); *B32B 2266/0257* (2013.01); *B32B 2266/0264* (2013.01); *B32B 2305/026* (2013.01); *B32B 2307/306* (2013.01); *B32B 2307/402* (2013.01); *B32B 2307/406* (2013.01); *B32B 2307/408* (2013.01); *B32B 2307/728* (2013.01); *B32B 2307/7244* (2013.01); *B32B 2307/7246* (2013.01); *B32B 2439/40* (2013.01); *B32B 2439/46* (2013.01); *B32B 2439/70* (2013.01); *B65D 2565/387* (2013.01)

(58) Field of Classification Search
CPC .. B32B 1/08; B32B 1/02; B32B 27/28; B32B 27/30; B32B 27/306; B32B 27/308; B32B 27/32; B32B 27/327; B32B 27/34; B32B 27/36; B32B 27/18; B32B 5/18; B29C 44/3469; B29C 47/0021; B29C 47/0042; B65D 85/08
See application file for complete search history.

(56) References Cited

U.S. PATENT DOCUMENTS

| 7,011,858 B2 | 3/2006 | Grolig et al. |
| 7,615,270 B2 | 11/2009 | Lee et al. |

(Continued)

FOREIGN PATENT DOCUMENTS

| DE | 10124581 | 11/2002 |
| EP | 1164856 | 1/2002 |

(Continued)

OTHER PUBLICATIONS

"Supercritical fluid" Wikipedia entry, 9 pages, accessed Feb. 8, 2018.*

(Continued)

*Primary Examiner* — Walter B Aughenbaugh
(74) *Attorney, Agent, or Firm* — Dilworth IP LLC

(57) ABSTRACT

Provided is a multilayered coextruded thermoplastic food casing comprising a porous inner layer capable of absorbing, retaining, desorbing and transferring at least one functional additive to food encased in said casing; a layer having a barrier effect for water vapor; and an adhesive layer, wherein the porosity of said porous inner layer is generated by (co)extruding a composition comprising a polymer and a supercritical pore-forming agent, and a method for producing said multilayered coextruded thermoplastic food casing.

22 Claims, No Drawings

(51) Int. Cl.
*B32B 3/26* (2006.01)
*B29K 23/00* (2006.01)
*B29K 77/00* (2006.01)
*B29K 105/04* (2006.01)
*B29L 7/00* (2006.01)
*B29L 9/00* (2006.01)
*B29L 31/00* (2006.01)
*A22C 13/00* (2006.01)

(56) References Cited

U.S. PATENT DOCUMENTS

| | | |
|---|---|---|
| 2006/0003058 A1 | 1/2006 | Koenig et al. |
| 2009/0214722 A1 | 8/2009 | Henze-Wethkamp et al. |
| 2011/0305940 A1 | 12/2011 | Usami et al. |

FOREIGN PATENT DOCUMENTS

| | | |
|---|---|---|
| EP | 0992194 | 1/2003 |
| EP | 1192864 | 2/2006 |
| EP | 1911352 | 4/2008 |
| JP | 2009057431 | 3/2009 |
| WO | 0040093 | 7/2000 |

OTHER PUBLICATIONS

Extended European Search Report mailed in EP 14190496.1 dated Jun. 1, 2015.
XP002739825 * JP 2004 331823 (abstract) Nippon Synthetic Chem Ind Co., Nov. 25, 2004.
XP002739826 & JP 2010 037367 (abstract) Asahi Fibreglass KK, Feb. 18, 2010.

* cited by examiner

MULTILAYERED COEXTRUDED THERMOPLASTIC FOOD CASING

TECHNICAL FIELD OF THE INVENTION

The present invention relates to a multi-layered coextruded thermoplastic food casing comprising at least one porous inner material free of any liquid pore-forming agent, especially any non-supercritical liquid pore-forming agent, a method for producing said multi-layered coextruded thermoplastic food casing and use of said multi-layered coextruded thermoplastic food casing as a sausage casing, which food casings are able to transfer functional food additives such as flavours or colours onto the enclosed foodstuff, especially in the production of meat, cheese or fish products.

BACKGROUND ART OF THE INVENTION

In the production of meat products, smoke treatment has a long tradition for taste and preservation reasons. In said tradition the smoking of the products in smoking rooms or chambers is widely used. However, in such a case the casings need to be permeable for the smoke, which means that the casing has a low water vapor barrier so that the meat product can lose weight during cooking and storage. To avoid weight loss during storage a secondary packaging may become necessary. However, smoke deposits on the walls and the ceiling of the smoking rooms can affect the appearance of meat products in the following cooking cycle. To avoid these drawbacks of a smoke treatment through a smoke-permeable casing, the inside of casings has been impregnated with liquid smoke, but also with colour solutions, e.g. solution on a caramel basis.

For a transfer of substances like liquid smoke or caramel solutions onto foodstuff, several casing structures have been described. As inner layers of the casing, some of these structures use hydrophilic materials, which allow the absorbance of the substance into the material. For example inner layers comprising starch were used. Other structures use as an inner layer a layer made of cellulose which will come into contact with the foodstuff. In such a case, however, absorption of the liquid into the paper or cellulose is observed. In case of a flat film, alternatively the desired substance can be sprayed, printed or scraped onto the surface. In order to achieve a sufficient fixation, a drying step has to be carried out before the flat film is formed into a tube.

The carrier film of these structures can be a fibrous layer, the major disadvantage of which is a low water vapor barrier effect. During a cooking process or storage of the product, the foodstuff loses part of its water content so as to reduce the yield. For this reason plastic coated fibrous casings and laminates comprising an outer plastic film and an inner paper or cellulose film have been developed. EP 0 992 194 A discloses a casing that consists of an impermeable film with a joined inner lining consisting of fibres made of cotton or cellulose, or woven, non-woven or knitted fabric, which is then impregnated and sealed to a tube or bag. Another example of a food casing which is capable of transferring food additives is described in US 2006/0003058 A, which teaches an at least two-layer tubular food casing comprising an inner layer formed of a thermoplastic organic polymer embedding a powdery organic filler such as starch. The casings described in these two documents combine the absorbance capacity of a material forming the inner layer with barrier properties provided by the outer (multi-layer) plastic films. However, such casings are disadvantageous because of a multi-step production process for preparing such coated or laminated casing structures, a possible mould growth on the inner starch, cellulose or paper layer and breaking problems during cooking.

U.S. Pat. No. 7,615,270 B2 discloses casings comprising an inner layer made of hydrophilic materials, such as e.g. block-copolyether ester or block-copolyether amide. Such casings suffer from the disadvantage that their absorbance capacity for liquid substances is limited. In many applications, such an absorbance capacity is insufficient in order to provide the desired effect onto the foodstuff. Furthermore, if liquid substance remains on the casing surface, a non-uniform distribution and formation of droplets upon opening of the tubular casing is likely and the transfer onto the foodstuff shows a marble-like, non-uniform coloration of the foodstuff.

DE 101 24 581 A teaches a food casing wherein liquid smoke is sprayed into the casing during shirring. As it takes a storage time of at least 5 days for the liquid smoke to migrate into the casing, the storage costs and the "time-to-customer" is high.

In general, the outer side of a casing is easily accessible for coating and impregnation. But, in the case of barrier films the casing needs to be turned inside out so that the treated surface will come into contact with the foodstuff. EP 1 192 864 A teaches a step of coating or impregnating the outer side of a casing which is stuffed into the bore of the strand so that it can be turned inside out during stuffing. Thus prior to a stuffing of the strand the treated outer surface of the casing can be contaminated during handling processes. When the treatment (coating/impregnation) is carried out by using a printing process, the edges are printed twice, which leaves two longitudinal lines of higher intensity on the foodstuff after peeling off the casing.

In order to increase the absorbance capacity of the thermoplastic inner layer, a formation of pores in that inner layer is desirable. Inner layers formed of a thermoplastic material as disclosed in EP 1 164 856 B1 show a network of interconnected interstices, which are in a range of 0.002 to 1 μm. Said inner layers are made from a food grade thermoplastic with the interstices being formed by a non-supercritical liquid pore-forming agent selected from soybean oil, peanut oil, corn oil, glycerine, sorbitol, polyethylene glycol, mineral oil or surfactants including polysorbate, polyoxyethylene (POE) 20, sorbitan monostearate, sorbitan monolaurate, sorbitan monooleate and glycerol monooleate. The thermoplastic material may further comprise an inorganic filler selected from silica ($SiO_2$), talc ($Mg_2SiO_4$), aluminium oxide, hydrated alumina, titanium oxide, zirconium oxide, sodium silicate, silicate, sodium chloride, calcium, calcium carbonate, clay or calcined clay.

EP 1 911 352 A1 discloses a multi-layered coextruded stretched thermoplastic food casing comprising at least one porous inner layer, wherein the porosity of the porous inner layer has been at least partially generated by stretching the coextruded casing, wherein at least an innermost porous inner layer has an interconnected porosity, such that said innermost porous inner layer is able to absorb, retain, desorb and to transfer at least one transferable functional additive from said at least one porous inner layer to food encased in said casing. The casing further comprises at least one layer having a barrier effect for water vapor, at least one layer having adhesion properties, said layer having adhesion properties can be the same or different from said porous inner layer and/or said layer having a barrier effect for water. The porous inner layer comprises at least one plastic material and at least one fine-grained filler and at least one pore-forming component of an oily pore-forming agent and an emulsifying agent.

US 2009/214722 A1 discloses a multi-layered seamless tubular casing capable of absorbing, storing and releasing a food additive, comprising an outer layer of a thermoplastic polymer, at least one intermediate functional layer made of thermoplastic polymer with barrier properties against oxygen and/or water vapor and one porous inner layer made of a thermoplastic polymer with a network of spaces connected to one another, which are formed by using a non-supercritical liquid pore-forming agent bringing about a phase separation of the thermoplastic and the porosity modifier. The non-supercritical liquid pore-forming agent is selected from the group consisting of soybean oils, peanut oils, corn oils, glycerols, sorbitols, polyethylene glycols, mineral oils or surfactants, polysorbates, polyoxyethylene (POE) 20, sorbitan monostearates, sorbitan monolaurates, sorbitan monooleates, glycerol monooleates, Surf actol 365, or mixtures of the aforementioned substances. The inner layer may further comprise an inorganic filler selected from the group of silicon dioxide, talc ($Mg_2SiO_4$), aluminium oxide, aluminium hydroxide, hydrated alumina, calcined alumina, titanium oxide, zirconium oxide, sodium silicate and silicate.

The inner layer of the casings described in EP 1 911 35 2A1 and US 2009/214722 A1 requires a complex recipe and compounding step. The compounds of the examples described in EP 1 911 352 A1 comprise a relatively high percentage of low molecular liquid pore-forming agents (19% oil and 8% glycerine), which make a compounding challenging and cost-intensive. In US 2009/214722 A1 the recipe of the inner layer is not disclosed, but the reported absorbance capacities are low. Furthermore, all such casings suffer from the fact that the liquid pore-forming agents used at least partially remain in the inner layer.

Therefore, the object to be solved by the present invention is to provide a multilayered coextruded thermoplastic food casing having a high strength and improved peelability the inner layer(s) of which has/have a high porosity, high functional additive absorption capacity, excellent capability of transferring food additives to the enclosed foodstuff, wherein said inner layer(s) do(es) not comprise any liquid pore-forming substance, especially any non-supercritical liquid pore-forming agent after formation of the inner layer.

Furthermore, it is an object of the present invention to provide a process for preparing such an improved multi-layered coextruded food casing.

SUMMARY OF THE INVENTION

According to the invention, there is provided a multilayered coextruded thermoplastic food casing comprising:
at least one porous inner layer;
at least one layer having a barrier effect for water vapor and/or oxygen;
at least one adhesive layer, said adhesive layer optionally being the same as or different from said at least one porous inner layer and/or said at least one layer having a barrier effect for water vapor and/or oxygen;
wherein the porosity of said at least one porous inner layer has been generated by (co)extruding a first polymer composition comprising a polymer and a supercritical pore-forming agent, wherein the porosity of the sum of said at least one porous inner layer is in a range of from 5 to 90% by volume, said at least one porous inner layer has a porosity comprising pores having a pore diameter of from 0.01 to 2000 μm, such that at least one of said at least one porous inner layer(s) is able to absorb, retain, desorb and to transfer at least one transferable functional additive from said at least one porous inner layer to food encased in said casing.

In a preferred embodiment said multi-layered coextruded thermoplastic food casing is free of any liquid pore-forming agent, especially any non-supercritical liquid pore-forming agent.

The present invention further provides a method for producing a multilayered coextruded thermoplastic food casing as defined above, comprising a step of subjecting a combination of a first polymer composition for forming at least one porous inner layer said first polymer composition comprising a polymer and a supercritical pore-forming agent, and at least one additional second polymer composition for forming a layer having a barrier effect for water vapor and/or oxygen to a co-extrusion process, wherein said polymer composition comprising a polymer and a supercritical pore-forming agent, after co-extrusion forms said at least one porous inner layer.

The method for producing a multi-layered coextruded thermoplastic food casing optionally further comprises a step of subjecting the casing obtained by the co-extrusion process subsequently to a bi-axial orientation treatment.

Furthermore, in a preferred embodiment of the present invention the first polymer composition which will form the at least one porous inner layer is a first polymer composition consisting of a polymer, a supercritical pore-forming agent and optionally a filler and/or optionally a nucleating agent.

As according to the present invention the multi-layered thermoplastic food casing is produced by a co-extrusion process, any disadvantages due to lamination can be avoided and, thus, mould-risks due to organic substances such as paper, cellulose or starch will be prohibited. Furthermore, in view of the production process used according to the present invention for example tubular multi-layered food casings can be produced which do not comprise any weakening seam or seal so that a non-uniformly coloured surface of the foodstuff will not be produced.

Furthermore, by subjecting said multi-layered coextruded thermoplastic food casing to a bi-axial orientation treatment, e.g. in a double- or triple-bubble-process, the strength of the casing structure can be further increased so that wrinkle-free and calibre consistent products can be produced.

If the multi-layered coextruded thermoplastic food casing is not subjected to an orientation treatment, the strength of the multi-layered thermoplastic food casing can be increased by additionally co-extruding (a) non-porous inner layer(s) having an increased wall thickness in order to guarantee good peelability without splitting into multiple pieces. Such a non-oriented multi-layered food casing may be desirable in slicer applications.

Furthermore, according to the present invention the functional additive absorption capacity can be easily adjusted by increasing or decreasing the thickness and/or the porosity of the at least one porous inner layer during co-extrusion. According to the present invention the term "functional additive absorption" should mean any absorption and/or adsorption of a functional additive into and/or onto the at least one porous inner layer. Contrary to the food casings known in the art, the porosity of the at least one inner layer of the food casing according to the present invention offers a complete absorption of the functional additive into the pores. Furthermore, the functional additive is practically completely transferred to the enclosed food article because the functional additive is not significantly retained in the material forming the inner layer(s).

In spite of the high porosity of the at least one inner layer of the food casing of the invention, the producibility of the casings according to the invention is surprisingly good. At the same time, due to the use of a supercritical pore-forming agent such as supercritical nitrogen or supercritical carbon dioxide the production process used according to the present invention is highly efficient and excludes the presence of any residual pore-forming agent in the food casing of the present invention, and, thus, any migration of said pore-forming agent which may remain in the food casing according to the present invention, into the foodstuff. Thus, by using a food casing according to the present invention due to the complete absence of any non-supercritical liquid pore-forming agent in the final food casing, any possible organoleptic impact on the foodstuff enclosed in the food casing can be avoided.

Preferably, the at least one porous inner layer of the food casing according to the present invention does not comprise (i.e., is free of) any non-supercritical liquid pore-forming agent, especially any pore-forming agents selected from the group consisting of the following non-supercritical liquid pore-forming agents:

1. mineral oils
2. biogenous oils such as peanut oil, soybean oil, sunflower oil, rape-oil, olive-oil or any combination thereof,
3. esters of natural fatty acids,
4. synthetic fatty acid esters of glycerin, such as glycerin monolaurate, glycerin monooleate, glycerin dioleate, glycerin trioleate or any combination thereof,
5. mono- or diglycerides of fatty acids, which optionally have been reacted to esters with any organic acid e.g. like acetic acid, lactic acid, citric acid or biacetyl tartaric acid or any combination thereof or any combination of substances within the different chemical groups,
6. polyglycerol esters of fatty acids,
7. alkyl polyglucosides,
8. esters of saccharose,
9. sugar glycerides,
10. sorbitan fatty acid esters such as sorbitan monostearate, sorbitan tristearate, sorbitan monolaurate, sorbitan monooleate, sorbitan monopalmitate or any combination thereof,
11. polyoxyethylene-sorbitan fatty acid esters such as Polysorbat® 20 (polyoxyethylene-(20)-sorbitan monolaurate), such as Polysorbat® 40 (polyoxyethylene-(20)-sorbitan monopalmitate), such as Polysorbat® 60 (polyoxyethylene-(20)-sorbitan monostearate), such as Polysorbat® 65 (polyoxyethylene-(20)-sorbitan tristearate) or like Polysorbat® 80 (polyoxyethylene-(20)-sorbitan monooleate),
12. C12- to C18-fatty alcohol ethoxylates,
13. pore-forming liquids based on glycerin or lecithin, such as viscous oil-like, but more polar liquids for example compounds on the basis of glycerin, lecithin or any combination thereof, and
14. glycolic compounds such as polyethylene glycol, propylene glycol ester especially of natural fatty acids like oleic acid, lauric acid, stearic acid, palmitic acid or any combination thereof.

The at least one layer having a barrier effect for water vapor and/or oxygen in the food casing according to the present invention assures a sufficient barrier effect so that the to-be-transferred functional additive does not readily diffuse to the outside of the casing so that the environment and machinery during handling and processing will not be contaminated.

Furthermore, by using a food casing according to the present invention weight loss during cooking and storage can be greatly decreased in comparison to conventional casings made of fibrous, cellulose or collagen.

Furthermore, in case of using as the at least one layer having a barrier effect for water vapor and/or oxygen at least one layer having a barrier effect for water vapor, the water vapor transmission rate of said at least one layer having a barrier effect for water vapor of the food casing according to the present invention can be adjusted in such a way that drying of the surface still can take place during cooking. Thus, the water vapor transmission rate of said at least one layer having a barrier effect for water vapor can be decreased for example by producing at least one polyolefin-based barrier layer. On the other hand the water vapor transmission rate of the at least one layer having a barrier effect for water vapor can be increased for example by reducing the wall thickness of the at least one layer having a barrier effect for water vapor or by incorporating hydrophilic components into the at least one layer having a barrier effect for water vapor and/or by sandwiching a microcellular layer between two layers having a barrier effect for water vapor. Thus, a surface wetness resulting from a diffusion of the food additive to the outer surface of the casing can be prohibited according to the present invention.

Also the oxygen barrier effect of the at least one layer having a barrier effect for water vapor and/or oxygen can be adjusted via adjusting the composition of the at least one layer having a barrier effect for water vapor and/or oxygen. For example, blends of polyamide and polyethylene vinyl alcohol or polyamide resins having a barrier effect for oxygen such as polyamide resins produced through polycondensation of meta-xylylene diamine (MXDA) with adipic acid (e.g. Nylon-MXD6® from Mitsubishi Gas Chemical Company) can be used.

In a further embodiment of the present invention a multilayered coextruded thermoplastic food casing according to the present invention as defined above may comprise at least 3 layers, the additional outer layer of which being a functional layer providing optical properties (e.g. colour or natural appearance) and/or haptical properties (e.g. roughness or soft touch) to the food casing. For example, an outer functional layer may provide a natural matt appearance of the food casing. Alternatively, use of two different colours in such an outer porous functional layer and a further more inner layer of the food casing according to the present invention can provide appealing optical effects. Depending on the polymer used and the porosity level produced, soft touch or rough surfaces on the most inner and/or outer microcellular layers of the food casing according to the present invention can be obtained. Contrary to a roughness created by the addition of inorganic fillers in the food casings known in the art, the surface roughness created by the process according to the invention, does not give rise to any abrasion on the rubber brakes of the stuffing machines.

In a further embodiment of the present invention, outer functional layers having an improved printability, optical and/or haptical properties (e.g. colour, roughness e.g. by fillers, additives or low vapor pressure liquids) can be produced by using recipes known to a person skilled in the art.

In a further embodiment the present invention provides a multilayered coextruded thermoplastic food casing comprising:

at least one inner layer having a barrier effect for water vapor and/or oxygen;
at least one porous outer layer;
at least one adhesive layer, said adhesive layer optionally being the same as or different from said at least one porous outer layer and/or said at least one inner layer having a barrier effect for water vapor and/or oxygen;
wherein the porosity of said at least one porous outer layer has been generated by (co)extruding a first polymer composition comprising a polymer and a supercritical pore-forming agent, wherein the porosity of the sum of said at least one porous outer layer is in a range of from 5 to 90% by volume, said at least one porous outer layer has a porosity comprising pores having a pore diameter of from 0.01 to 2000 µm.

Furthermore, in a preferred embodiment of the present invention the first polymer composition which will form the at least one porous outer layer is a first polymer composition consisting of a polymer, a supercritical pore-forming agent and optionally a filler.

In a further embodiment the present invention provides a method for producing a multilayered coextruded thermoplastic food casing comprising:
at least one inner layer having a barrier effect for water vapor and/or oxygen;
at least one porous outer layer;
at least one adhesive layer, said adhesive layer optionally being the same as or different from said at least one porous outer layer and/or said at least one inner layer having a barrier effect for water vapor and/or oxygen;
said method comprising a step of subjecting a combination of a first polymer composition comprising a polymer and a supercritical pore-forming agent, and at least one additional second polymer composition to a co-extrusion process, wherein said first polymer composition comprising a polymer and a supercritical pore-forming agent, after co-extrusion forms said at least one porous outer layer.

DETAILED DESCRIPTION OF THE INVENTION

A food casing according to the invention may be used as a packaging for any type of food including but not limited to meat products, sausage products, milk products, cheese products and dishes, whole or processed—especially to meat containing products like fermented sausages, cooked-meat sausage (Kochwurst), scalded emulsion sausage (Brühwurst) like frankfurters, cooked ham (Kochschinken), ham, pickled meat, smoked turkey breast and salt meat (Pökelware), vegetables, dairy products like cheese, carbohydrates, soybean products as well as different mixtures or in any desired application. The food casings according to the present invention may be used in any desired form such as in the form of "endless" tubes, sections, rings such as sausage rings, customized products such as shirred sticks, and the food casing according to the present invention can be empty, stuffed and further processed if desired.

Food is often processed, i.e. cooked in a plastic film package, for example by at least partially immersing the package in hot water or placing the package in a steam cabinet. The processed food package may then be refrigerated until the processed food is prepared for a meal or is to be consumed, or it is peeled and further packaged after portioning into pieces or slices. During the cooking process e.g. of meat, for example, smoke or other modifiers for color, flavor or fragrance diffuse into the food material.

Transferable Functional Additives

The at least one transferable functional additive may be, for example one or more of colorants such as caramel or paprika extract, flavorants such as glutamates, fragrances such as terpenoides and/or any other desired food additives. Many transferable functional additives can be effective as different (such as two or three) types of transferable functional additives selected from colorants, flavorants and fragrances. For example liquid smoke functions as a colorant, a flavorant as well as a fragrance.

A colorant, flavorant, fragrance and/or any other additive or any combination thereof may be applied—in one of the possible embodiments—to the casing in any desired way e.g. in a tube containing the liquid, dispersed, dissolved or in any combination. The transferable functional additive can be in a liquid mass which may preferably be distributed with the aid of a liquid bubble such that the additive may be moved or distributed or both. In this way, the content of the transferable functional additive may be directly applied to a coextruded and optionally stretched casing. The transferable functional additive may be applied in its commercially available condition—preferably in a liquid form, especially in a dissolved form, dispersed form or in a dissolved and dispersed form, e.g. in water—or in a modified condition. More preferred, it is dissolved in water. It is typically applied onto an inner surface of the casing, which is the outer surface of the innermost of the at least one porous inner layer (P) or onto the whole film(s), or onto the whole casing e.g. by dipping, flooding, spraying or even by squeezing of the tube containing the liquid mass. This can be effected e.g. with the aid of squeezing rollers and distributing the liquid at least partially on the surface of the inner layer of the casing e.g. with the aid of such squeezing rollers. Preferably at least one of these compounds or a mixture containing at least one of these compounds—preferably in a liquid form—may be absorbed, charged, distributed, incorporated, injected, applied as a film or coating or in any combination thereof onto/in/into a film or an inner layer of the casing. It is especially desirable that the additive(s) are provided onto/in/into the at least one porous inner layer or onto/in/into parts of the at least one porous inner layer e.g. by the effect of capillary forces, and are optionally maintained at least partially in the layer. In one embodiment, it is preferred that only the at least one porous inner layer is contacted with such compound(s) or their mixture(s). The surface of the film, casing or the at least one porous inner layer (P) may be dry after the application, especially, if only surfaces of porous layers are contacted with such fluid or liquid. The transfer of these compounds/mixtures from the at least one porous inner layer (P) of the food casing to the food may occur to a great extent or nearly completely via their interface. This is particularly the case if the at least one porous inner layer is formed of non-polar polymers such as polyolefins. If the colorant, the flavorant, the fragrance and/or any other additive is polar in nature, the transmission of such compound(s) may sometimes be nearly complete or perhaps even complete.

The fluid or liquid of the at least one transferable functional additive is preferably taken up from the pores contained in the at least one porous inner layer. A casing according to the present invention preferably has at least one porous inner layer, but it is preferred in several embodiments that most or all the other layers of the casing have low, nearly no or no porosity at all. It is preferred that such other layers show a high strength. If a casing has at least one non-porous layer having a barrier effect for water vapor and/or oxygen and at least one porous inner layer, casings which are sufficiently porous can be formed. Such casings have a sufficient strength, a sufficient flexibility and/or a barrier effect for water vapor or gases like oxygen gas or both.

The at Least One Porous Layer

In one embodiment the food casing according to the present invention typically comprises at least one porous layer serving as the porous inner layer. Alternatively two, three or four or more porous inner layers may form a group of porous inner layers, of which one is the innermost porous layer whose surface is adjacent to the encased food. Typically, at least one porous inner layer is designed to absorb/adsorb and therefore to immobilize the at least one transferable functional additive. The additive can be in liquid form and after it is immobilized, it can be desorbed, mobilized and transferred to food it is in contact with.

In another embodiment the food casing according to the present invention comprises at least one porous layer serving as the porous outer layer.

The at least one porous inner or outer layer preferably contains at least one thermoplastic polymer component.

Thermoplastic polymer components within the meaning of this invention include organic polymers having an essential content of thermoplastic organic polymers. Typically such thermoplastic organic polymers have a transition region of flowing above the temperature of their use and below their melting temperature—especially for at least partially crystalline organic polymers. In many embodiments, the at least one porous inner or outer layer contains more than one typically thermoplastic organic polymer component. Often there are two or three, and sometimes even more than three different thermoplastic polymers or even at least two different thermoplastic polymers which differ in at least one chemical group contained therein.

Of the typically thermoplastic organic polymers usable according to the present invention, the following are especially preferred:

(Co-)Polyamides, such as homo-, co- or ter-polyamides, preferably aliphatic (co-)polyamides, partially aromatic (co-)polyamides;
polyolefins, preferably polyethylenes, polypropylenes or copolymers based on e.g. ethylene, propylene, or other -olefins, poly(iso)butene or any mixture thereof;
vinyl copolymers like ethylene vinyl acetate copolymers, polyvinyl alcohols, ethylene vinyl alcohol copolymers (EVOH) or any combination thereof, which optionally is partially or totally saponified, such as ethylene vinyl alcohol copolymers; polyvinylpyrrolidone, polystyrene, polyvinylchloride, polyvinylfluoride or any combination thereof;
vinylidenechloride (co-)polymers (PVDC), e.g. copolymers of vinylidene chloride with comonomer(s) such as vinyl chloride or (meth)acrylate;
(co-)polyesters of aliphatic, (partially) aromatic or aliphatic and aromatic character e.g. polylactide, polycaprolactone, polycarbonate or (co-)polymers of aliphatic diols with aliphatic or aromatic dicarboxylic acid(s) such as terephthalate(s), such as poly(butylenes glycol terephthalate).

In a preferred embodiment as the thermoplastic organic polymers there are used copolymers of ethylene or propylene, more preferably linear alpha-olefins with 3 to 8 C-atoms with alpha-beta-unsaturated carboxylic acids, more preferably acrylic acid, methacrylic acid and/or their metal salts and/or their alkylester or corresponding graft-copolymers of the above-mentioned monomers onto polyolefins or partially saponified ethylene/vinylacetate-copolymers, which are optionally graft-polymerised with an alpha-beta-unsaturated carboxylic acid and have a low degree of saponification, or their blends. Furthermore, modified polyolefins such as modified homo- or copolymers of ethylene and/or propylene and optionally further alpha-olefins with 3 to 8 C-atoms, which contain grafted monomers such as alpha-beta-unsaturated dicarboxylic acids, preferably maleic acid, fumaric acid, itaconic acid or their acidic anhydrides, acid esters, acid amides or acid imides can be used according to the present invention. Most preferred are polyolefins which contain grafted maleic anhydride, because grafted maleic anhydride groups provide an adhesive function so that delamination of e.g. polyamide-based and polyolefin-based layers can be avoided.

In another preferred embodiment of the present invention polyolefins can be used as thermoplastic organic polymers, such as homopolymers of ethylene or propylene and/or copolymers of linear alpha-olefins with 2 to 8 C-atoms, preferably linear low density polyethylene, low density polyethylene, high density polyethylene, homo-polypropylene, block-polypropylene and random copolymers of propylene. In an even more preferred embodiment low density and linear low density polyethylene can be used.

In another preferred embodiment of the present invention polyamides can be used as thermoplastic organic polymers, such as homo-, co- or ter-polyamides which can be produced from the corresponding monomers such as caprolactam, laurinlactam, omegaaminoundecan acid, adipinic acid, azelainic acid, sebacinic acid, decandicarbonic acid, dodecandicarbonic acid, terephthalic acid, isophthalic acid, tetramethylendiamine, pentamethylendiamine, hexamethylendiamine, octamethylendiamine and xylylendiamine. Preferred polyamides to be used according to the present invention are homo- and copolyamides such as polyamide 6, polyamide 12, polyamide 66, polyamide 610, polyamide 612, polyamide MXD6, polyamide 6/66, polyamide 66/6, polyamide 6/12 and polyamide 6I/6T. In an even more preferred embodiment polyamide 6 and polyamide 6/66 can be used.

Furthermore, the thermoplastic organic polymer to be used according to the present invention may comprise additional hydrophilic components such as a polyetherester copolymer, polyvinylalcohol, polyesterblockamide, copoly etheresteramide or block copolymer polyether amide so as to facilitate the water vapor transmission through the matrix of the porous inner layer(s). Such a hydrophilic component may be used if a higher water transmission rate of the food casing is desirable, e.g. if a drying during cooking and/or storage of the foodstuff is desired.

The at least one porous inner or outer layer usually has a wall thickness of 1 to 300 µm, preferably 5 to 200 µm, more preferably 10 to 160 µm. The layer thickness depends on the desired absorption capacity and the number of layers available to achieve the desired absorption capacity.

According to the present invention the porous structure of the at least one porous inner or outer layer is created by a supercritical pore-forming agent introduced into the molten polymer or polymer mixture in the extruder designated to form the porous inner or outer layer(s), in such a way that a solution is being generated. In contrast, in the food casings known in the art the hollow spaces or interstices of the porous inner or outer layer(s) are formed by using non-supercritical liquid pore-forming agents such as hydrophobic oils or oily substances.

One benefit of using a supercritical pore-forming agent is that according to the present invention no pore-forming agent will remain in the at least one porous inner layer after extrusion of the polymer mixture.

Furthermore, the pore structure of the at least one porous inner or outer layer such as pore size, porosity level and so on, can be controlled much more exactly according to the present invention.

Any of a wide variety of supercritical pore-forming agents such as supercritical nitrogen, supercritical oxygen, supercritical helium or supercritical carbon dioxide, more preferably supercritical carbon dioxide or supercritical nitrogen, even more preferably supercritical nitrogen may be used as the supercritical pore-forming agent to be used according to the present invention. Said supercritical pore-forming agent is introduced into the extruder and mixed with at least one first polymer (for forming the at least one porous inner or outer layer) for example a thermoplastic organic polymer so as to form rapidly a single-phase solution with the polymeric material by injecting said pore-forming agent as a supercritical fluid.

Usually, the supercritical pore-forming agent is introduced into said polymeric material which is designated to form the porous inner layer(s), via a port of an extruder in an amount of 0.001 to 10 weight-%, based on the weight of the polymer mixture forming said inner or outer porous layer(s).

As outlined above, the supercritical pore-forming agent to be used according to the present invention preferably is selected from the group consisting of supercritical nitrogen and supercritical carbon dioxide. In principle, other supercritical fluids such as supercritical helium or supercritical oxygen can be used as well. However, even if the supercritical point of such agents allows their usage, flammability, costs and/or health and environmental concerns may create disadvantages compared to supercritical nitrogen or carbon dioxide. The supercritical point of nitrogen is at 34 bar and $-147°$ C., while the supercritical point of carbon dioxide is at 72 bar and $31°$ C. The concentration of the supercritical pore-forming agent in the polymer mixture forming the inner or outer porous layer(s) is usually in a range of from 0.001 to 10 weight-%, preferably in the range from 0.005 to 1 weight-%, most preferably in the range from 0.01 to 0.5 weight-% based on the weight of the polymer mixture forming said at least one inner or outer porous layer.

In addition, optionally the at least one porous inner or outer layer may comprise a filler. Preferably, said filler is an inorganic filler. In a preferred embodiment said filler—if used—is selected from silica(s) such as quartz, fused quartz, cristobalite, diatomaceous earth, silica sol, silica gel, precipitated or pyrogenic silica or any combination of these silica types, talc, calcium carbonate(s), barium sulfate, alumina(s), aluminum hydroxide(s), magnesium hydroxide, titania(s), zirconia, silicate(s) preferably as precipitated Ca—, Al—, CaAl—, NaAl-silicates, as mica(s), kaolin, wollastonite or any combination of these silicates, NaCl or any combination between substances of these different substance groups. Such fillers are preferably added in a fine particulate form, although other forms like gel etc. can be used if desired.

In a more preferred embodiment the filler is selected from silicates, carbonates, or hydroxides known to a person skilled in the art. Most widely used is talc or calcium carbonate. Preferably, the filler(s) used has/have an average grain size in the range from 0.02 to 12 µm, more preferred in the range from 0.05 to 8 µm, often in the range from 0.2 to 5 µm. Such filler(s) may also improve absorption/adsorption of the at least one transferable functional additive in at least one porous inner layer. Preferably, at least one porous inner layer is able to carry the at least one transferable functional additive. Typically the filler is added in an amount of from 0.1 to 20 weight-%, preferably from 0.1 to 15 weight-%, most preferably from 0.2 to 12 weight-%, based on the weight of the polymeric material used to form the porous inner layer(s).

Furthermore, optionally the at least one porous inner or outer layer may comprise a nucleating agent. According to the present invention the nucleating agent may be selected from the group consisting of carbonates (e.g. sodium bicarbonate), hydrazine derivatives (e.g. 4,4'-oxibis(benzenesulfonylhydrazide)), azo compounds (e.g. azodicarbonamide), semicarbazides, tetrazoles, nitroso compounds and/or citric acid and derivatives thereof.

In a preferred embodiment of the present invention in the multi-layered coextruded thermoplastic food casing according to the present invention (i.e., after its production) the at least one porous inner or outer layer consists of polymer and optionally a filler and/or optionally a nucleating agent.

Especially, in the multi-layered coextruded thermoplastic food casing according to the present invention (i.e., after its production) the porous inner layer of the food casing according to the present invention does not comprise (i.e., is free of) any liquid pore-forming agent, especially any non-supercritical liquid pore-forming agents selected from the group consisting of the following pore-forming agents:
1. mineral oils
2. biogenous oils such as peanut oil, soybean oil, sunflower oil, rape-oil, olive-oil or any combination thereof,
3. esters of natural fatty acids,
4. synthetic fatty acid esters of glycerin, such as glycerin monolaurate, glycerin monooleate, glycerin dioleate, glycerin trioleate or any combination thereof,
5. mono- or diglycerides of fatty acids, which optionally have been reacted to esters with any organic acid e.g. like acetic acid, lactic acid, citric acid or biacetyl tartaric acid or any combination thereof or any combination of substances within the different chemical groups,
6. polyglycerol esters of fatty acids,
7. alkyl polyglucosides,
8. esters of saccharose,
9. sugar glycerides,
10. sorbitan fatty acid esters such as sorbitan monostearate, sorbitan tristearate, sorbitan monolaurate, sorbitan monooleate, sorbitan monopalmitate or any combination thereof,
11. polyoxyethylene-sorbitan fatty acid esters such as Polysorbat® 20 (polyoxyethylene-(20)-sorbitan monolaurate), such as Polysorbat® 40 (polyoxyethylene-(20)-sorbitan monopalmitate), such as Polysorbat® 60 (polyoxyethylene-(20)-sorbitan monostearate), such as Polysorbat® 65 (polyoxyethylene-(20)-sorbitan tristearate) or like Polysorbat® 80 (polyoxyethylene-(20)-sorbitan monooleate),
12. C12- to C18-fatty alcohol ethoxylates,
13. Pore-forming liquids based on glycerin or lecithin such as viscous oil-like, but more polar liquids for example compounds on the basis of glycerin, lecithin or any combination thereof, and
14. glycolic compounds such as polyethylene glycol, propylene glycol ester especially of natural fatty acids like oleic acid, lauric acid, stearic acid, palmitic acid or any combination thereof.

Usually, the at least one porous inner or outer layer contains a total porosity in the range of from 5 to 90% by volume, preferably in the range of from 40 to 90% by volume, more preferably of from more than 70 to 90% by volume, most preferably of from 72 to 90% by volume.

If more than one porous inner layer is included in the casing, the porosity may preferably be varied from layer to layer, especially in such way that the innermost or the second innermost porous layer of all said inner porous layers has the highest porosity.

Nevertheless, the group of all porous inner or outer layers of a casing usually shows a total porosity in the range from 5 to 90% by volume, preferably in the range of from 40 to 90% by volume, more preferably of from more than 70 to 90% by volume, most preferably of from 72 to 90% by volume.

The pore diameters of the group of pores and the porosity channels in the porous inner or outer layers making up the largest distribution may preferably be in the range from 0.01 to 2000 µm, often in the range from 0.05 to 1200 µm. Preferably, the at least one porous inner or outer layer of the food casing has pore channels predominantly having diameters in the range from 0.02 to 1000 µm, more preferred in the range from 0.1 to 800 µm, as calculated via the numbers of well visible pores and their smallest diameter in the plane of the surface under a scanning electron microscope (SEM) or on SEM photographs. Often, the pore size distribution of the pores of the at least one porous inner or outer layer or of the whole food casing or of both shows a pore size distribution that has two, three or four peaks. The average diameter d50 of the pore diameter distribution in the porous inner or outer layers may preferably be in the range from 0.1 to 500 µm, more preferred in the range from 0.5 to 400 µm or from 1 to 300 µm, most preferred in the range from 1.5 to 200 µm or from 2 to 150 µm. In many embodiments, the d95 data of the pore diameter distribution in the porous inner or outer layers may preferably be in the range from 10 to 3500 µm, more preferred in the range from 20 to 3000 µm or from 30 to 2400 µm, most preferred in the range from 40 to 1800 µm or from 50 to 1400 µm or from 60 to 1000 µm.

The porosity of the different layers of the food casing according to the present invention may be measured on cross-sections of casings or films prepared with a cryo-microtome. The measurements of the (total) porosity may be performed under a scanning electron microscope (SEM) or on SEM photographs, e.g. with the aid of measurement lines counting the number of points or measurement lengths for the porosity in relation to the total number of points respectively length of the total measurement length. According to the present invention the porosity is the sum of the interconnected porosity (pore channels etc.) and of the closed porosity (closed pores). The ratio of the interconnected porosity to the closed porosity may vary in broad ranges. Depending on the pore size the interconnected porosity may be measured according to the mercury pressure penetration method with the aid of adequate high pressure equipment. However, in cases, which involve larger pore sizes, the absorption capacity of the porosity formed cannot be adequately determined by the evaluation of cross-sections or the mercury pressure penetration method. In these cases the porosity can be easier determined by measuring the total wall thickness of the at least one inner or outer porous layer using a thickness measurement gauge and determining the free volume via subtraction of the non-porous volume of said at least one layer which was extruded. For the non-porous volume the layer thicknesses of barrier layers in the final casings are evaluated by light microscopy. Knowing the extruded volume for every individual layer via the rotations per minute of its melt pump, the layer thickness of the inner or outer layer when non-porous is calculated by dividing the thickness of all barrier layers by their extruded volume per minute and multiplying by the extruded volume of the inner or outer layer. The porosity is calculated using the ratio of the thickness of the at least one porous inner or outer layer when non-porous to the layer thickness of the porous inner or outer layer, resulting from the difference between mean wall thickness and the sum of all thicknesses of the barrier layers.

The layer thickness of the different layers may also be measured under a light microscope (LM) or on LM photographs, especially in a cross-section cut vertically or nearly vertically through the casing. The layer thickness of a single porous inner or outer layer may preferably be in the range from 1 to 300 µm, more preferred in the range from 5 to 200 µm or from 10 to 160 µm, most preferred in the range from 30 to 140 µm or from 56 to 130 µm.

A single porous inner layer or a group of porous inner layers is preferably suitable or able to take up the at least one transferable functional additive such as liquid smoke within a contact time e.g. of up to 15 to 25 s at 20° C. and at atmospheric pressure when assuming a total layer thickness of the at least one porous inner layer as being in the range from 30 to 150 µm, in an amount of preferably in the range from 1 to 100 g/m$^2$, more preferably in the range from 5 to 90 g/m$^2$ or from 10 to 80 g/m$^2$, most preferred in the range from 15 to 70 g/m$^2$ especially of liquid smoke of the product "Hickory Teepak Alkalized Smoke" of Kerry Ingredients & Flavours. With this liquid smoke, absorption capacities of more than 0.3 g/m$^2$ per µm porous inner layer thickness, more preferably more than 0.4 g/m$^2$ per µm porous inner layer thickness, most preferably more than 0.5 g/m$^2$ per µm porous inner layer thickness.

In many embodiments, the surfaces of the hollow spaces and channels of the interconnected porosity of at least one porous inner layer are able to absorb/adsorb a transferable functional additive, to store it and, subsequently, to release and to transfer it. In many cases the functional additive is stored in the at least one porous inner layer then comes in direct contact to the food when food is encased in the casing and then the at least one functional additive is transferred to the food.

The compositions and other properties of more than one layer of the porous inner layers within one casing may differ between an innermost porous layer and one or more other porous layer(s), although they may be partially or totally identical if desired.

If there is present at least one additional porous inner layer adjacent to the innermost porous layer contacting the foodstuff, the at least one additional porous inner layer can increase the amount of functional food additive, which can be absorbed/adsorbed by the casing, and/or it can improve the adhesion of the adjacent layers, which may show less adhesion if the additional porous inner layer were not present. A typical example is a porous inner layer based on modified polyolefin as an adhesive layer between a layer based on polyamide and a layer based on polyolefin.

The Layer Having a Barrier Effect for Water Vapor

Usually the at least one layer having a barrier effect for water vapor is predominantly made of a thermoplastic polymer. A layer having a good barrier effect for water vapor shows a water vapor transmission rate of 0.01 to 500 g/m$^2$ d, preferably 0.1 to 100 g/m$^2$ d, more preferably 1 to 20 g/m$^2$ d, even more preferably 1 to 4 g/m$^2$ d or less at 23° C. and 85% relative humidity according to ASTM E398-03. If the food casing according to the invention shows a water vapor transmission of 20 g/m$^2$ d or less, then the encased foodstuff does not easily loose its moisture and the encased meat products stay fresh for extended time periods.

Said thermoplastic polymers to be used for the at least one layer having a barrier effect for water vapor are typically the same thermoplastic polymers as those mentioned above with respect to the at least one porous inner or outer layer. In a preferred embodiment said thermoplastic polymers to be used for the at least one layer having a barrier effect for water vapor are selected from the group consisting of polyolefins, copolymers comprising ethylene and/or propylene and/or linear alpha-olefins with 3 to 8 C-atoms, copolymers to be used for an optional adhesive layer as described below, polyamides (homo-, co- or ter-polyamides), thermoplasts having an oxygen barrier effect and (co)polyesters. Mixtures of these thermoplastic polymers can be used as well. Where necessary, compatibilizers known to a person skilled in the art can be added to the thermoplastic polymer. Compatibilizers can for example be selected from the group consisting of copolymers of ethylene and vinyl acetate (EVA), ethylene and acrylic acid (EAA), ethylene and methacrylic acid (EMAA), ethylene and methyl acrylate (EMA), ionomers and/or anhydride modified polyolefins.

The water vapor barrier properties may be provided by using at least one polyolefin layer. These layers typically predominantly comprise organic polymers based on polyethylene, polypropylene, polybutylene, copolymers containing units of ethylene, of propylene, of α-olefin preferably with 4 to 8 carbon atoms, of dienes and/or any combination of these units or any combination of such organic polymers. Even functionalized vinyl monomers like vinyl acetate, (meth)acrylic acid and (meth)acrylic acid ester may be possible co-units for the copolymers. The more preferred copolymers are those comprising C2/C3 or C2/C8 polyolefin copolymers or a combination of these.

Furthermore, the at least one layer having a barrier effect for water vapor may additionally contain a dye, a fine-grained pigment or both which may be used for the coloring and/or for the UV protection of such casings. The at least one layer having a barrier effect for water vapor, therefore, may optionally be colored. Therefore, the compositions for the production of the at least one layer having a barrier effect for water vapor as well as the composition of the at least one layer having a barrier effect for water vapor may consist essentially of the above mentioned substances, if desired. The compositions and other properties of more than the at least one layer having a barrier effect for water vapor within one casing are independent one from the other, although they may be partially or totally identical.

Often, the at least one layer having a barrier effect for water vapor has a good adhesion to an adjacent porous inner layer so that there is no necessity to add an adhesion promoter to the material of the at least one layer having a barrier effect for water vapor or to include an adhesion layer between those layers. But, it may be preferred in some embodiments that the at least one layer having a barrier effect for water vapor includes at least one adhesion promoter, especially, if there is a layer having an oxygen barrier effect or another functional layer adjacent which does not comprise (an) adhesion promoter(s).

Additionally, the layer having a barrier effect for water vapor can provide strength, printability (if the outside layer) and/or protection against external damage. The barrier properties furthermore prevent the absorbed/adsorbed substance from migrating to the outside of the casing during cooking and storage.

The wall thickness of layers having a barrier effect for water vapor which comprise (an) adhesion promoter(s) can have a thickness of 1 to 10 μm, preferably 2 to 7 μm, more preferably 3 to 5 μm.

The wall thickness of layers having a barrier effect for water vapor can be in a range of from 5 to 50 μm, depending on the required strength, barrier and/or puncture/tear resistance to be achieved.

The Layer Having an Oxygen Barrier Effect

According to the present invention a layer having an oxygen barrier effect is meant to be a layer which is a good barrier for oxygen or other gases or both and shows preferably an oxygen gas transmission rate through the food casing of the present invention of 30 $cm^3/(m^2$ d bar) or less, more preferred of less than 20 $cm^3/(m^2$ d bar), often in the range of 6 to 12 $cm^3/(m^2$ d bar), sometimes of about 0 or about 1 to less than 6 $cm^3/(m^2$ d bar) for a layer thickness of 20 μm when tested according to ISO 15105-2/DIN 53380-3 at 23° C. and 50% relative humidity.

Suitable plastic materials for forming such layers include ethylene vinyl alcohol copolymers (EVOH), which may optionally be partially or totally saponified, or vinylidene chloride copolymers (PVDC), for example with vinyl chloride or (meth)acrylate as comonomers or a mixture of these. These polymers may be admixed with additives, such as softeners or other organic polymers, e.g. copolyamides and/or ionomers. Therefore, the compositions for the manufacture of a layer having an oxygen barrier effect as well as the composition of the formed layer having an oxygen barrier effect may consist essentially of the above mentioned components, if desired. The compositions and other properties of more than one layer having an oxygen barrier effect within one casing are independent from one another, although they may be partially or totally identical. The layers having a barrier effect for water vapor and/or the layers having an oxygen barrier effect are often thermoplastic layers.

Optionally, the food casing according to the present invention further comprises at least one adhesive layer which will be described in more detail below. Said optional at least one adhesive layer can be in direct contact with a layer having an oxygen barrier effect on at least one side of the layer having an oxygen barrier effect, especially if the adjacent layer is not a layer comprising an adhesion promoter.

The wall thickness of a barrier layer having oxygen barrier effect can be in a range of from 1 to 20 μm, preferably 2 to 15 μm, more preferably 2 to 10 μm.

If the multilayered coextruded thermoplastic food casing according to the present invention is to be used for fermenting products and/or cheese, the permeability for gases such as oxygen may be desired and, thus, a layer having an oxygen barrier effect may not be present.

Optional Adhesive Layer

In some cases the layers having a barrier effect for water vapor and/or the layers having an oxygen barrier effect of the casing according to the invention do not adhere sufficiently to each other and/or to other layer(s) when they are coextruded without any adhesive layer in between or without any layer having a sufficient content of at least one adhesion promoter or without both. Good adhesion may be achieved, for example, if at least one intermediate adhesive layer is generated between neighboring layers of at least one other type. Such an adhesive layer providing suitable adhesion properties may predominantly contain grafted copolymers, linear copolymers or both types of copolymers. These copolymers may comprise more than one or even more than two different monomer types, for example ethylene units, propylene units, (meth)acrylic acid units, (meth)acrylic acid ester units, vinyl acetate units, maleic anhydride units or any combination of these. More preferred are maleic anhydride grafted polyethylenes (LDPE-g-MAAA, HDPE-g-MAA, LLDPE-g-MAA and the like), ethylene-acrylic acid ester copolymers, ethylene-vinyl acetate copolymers (EVA) or any combination of these. All these polymeric substances may be present alone or in combination in anyone of the adhesive layers. Furthermore, the adhesive layer may additionally contain any further organic polymers like polyethylene, any pigments, any other additives or any combination of these. Therefore, the compositions for the manufacture of an adhesive layer as well as the composition of the formed adhesive layer may consist essentially of the above mentioned substances if desired. The compositions and other properties of more than one adhesive layer when more than one adhesive layer is present in one casing according to the invention are independent one from the other, although they may be partially or totally identical. The intermediate adhesive layer(s) may be omitted if there is a sufficient adhesion between neighboring layers as it often occurs for example between polyamide layers and some types of ethylene vinyl alcohol copolymers (EVOH) layers or if any adhesive promoter is admixed into the composition of the adjacent layers e.g. a layer having a barrier effect for water vapor and/or an oxygen barrier effect.

Typically, the adhesive layer contains at least 50% by weight of at least one substance that has adhesive properties. Often, its content is at least 60% by weight, more preferred at least 70% or 80% by weight, sometimes at least 90% by weight, in most cases even up to 100% by weight. By the adequate selection and use of at least one adhesion promoter for the adhesive layer, an excellent adhesion between the adjacent layers is generated. Thereby, adhesion of parts of the casing or parts at least of the inner layer to the food can be minimized or prevented.

Often, at least one adhesive layer is a good barrier for water vapor, but in many embodiments an adhesive layer can be the only barrier for water vapor in the food casing. If there is another layer in the casing that is a barrier for water vapor, there may perhaps not be any adhesive layer.

Optional Additional Functional Layer

According to the present invention the food casing of the invention may optionally further comprise one or more additional functional layer(s). According to the present invention a functional layer is understood to be a layer with a significant content of (co-)polyamides, preferably showing a content of (co-)polyamides in the range from 8 to 100% by weight or from 10 to 95% by weight, often from 15 to 90 or from 20 to 80% by weight, sometimes from 35 to 70 or even from 50 to 60% by weight. The same ranges as mentioned above and infra apply for the compositions for forming an additional functional layer. Such an additional functional layer may contain one, two or even several different aliphatic polyamides, aliphatic copolyamides or both as well as optionally a content of partially aromatic polyamides, partially aromatic copolyamides or both.

The optional additional functional layer may have a wall thickness of 2 to 40 µm, preferably 3 to 30 µm, more preferably 4 to 20 µm. The thickness depends on the effect the layer shall provide, for example it may contribute to the strength and barrier effect of the final casing structure.

Optionally at least one additional functional layer can be positioned as an outermost layer without direct contact to the at least one porous inner layer. In this case for example the additional functional layer may provide a good printability.

Examples of the (co-)polyamides to be used for the optional additional functional layer are:
 aliphatic Polyamides: PA6, PA66, PA11, PA12;
 aliphatic Copolyamides: PA4/6, PA6/66, PA6/69, PA6/9, PA6/10, PA6/12, polyether amides, polyester amides, polyether ester amides, polyamide urethanes, poly (ether-block-amides);
 partially aromatic polyamides: PA6-I (I=isophthalic acid), Nylon-MXD-6 (polycondensate of m-xylylenediamine and adipic acid);
 partially aromatic copolyamides: PA6-I/6-T, PA6/6-I (I=isophthalic acid, T=terephthalic acid).

Especially preferred components are PA6, PA66, PA 12, PA6/66, Nylon-MXD-6 or PA6-I/6-T or any combination thereof. Especially preferred mixtures contain at least two different substances of these components. The amount of partially aromatic (co-)polyamides may preferably be not more than 40% by weight in relation to a single additional functional layer, more preferred not more than 25% by weight.

Additionally, the at least one additional functional layer may contain any other organic polymeric material such as olefinic copolymers such as ethylene-(meth)acrylic acid copolymers (EMAA), ionomeric materials derived from or related to EMAA, ethylene vinyl alcohol copolymers (EVOH), even water-soluble or hot water-soluble synthetic organic polymeric materials like polyvinyl alcohols (PVA) which all may optionally be partially or totally saponified, polyvinyl pyrrolidone, copolymers of vinylalcohols with propene-1-ol, polyalkylene glycols, copolymers of vinyl pyrrolidone with at least one, -olefinic unsaturated monomer unit, polymeric materials of N-vinylalkylam ides or (co-) polymers of acrylic acid, of acrylamide or of acrylic acid and acrylamide or any combination of all of these substances.

The amount of the at least one other organic polymeric material of the at least one additional functional layer that is not a (co-)polyamide, is preferably less than 50% by weight in relation to the content of solids and effective compounds of the composition to be used for a single additional functional layer as well as in relation to the material of a single additional functional layer, more preferred not more than 40% by weight, but often at least 0.1% by weight.

The optional additional functional layer preferably contains at least 50% by weight of (co-)polyamide(s), often at least 60% by weight, more preferred at least 70% or at least 80% by weight, sometimes even at least 90% by weight, sometimes even at least 95% or even up to 100% by weight.

Furthermore, the optional additional functional layer may optionally contain at least one fine-grained pigment, at least one additive like a lubricant, an anti-blocking agent, a light stabilizer or any combination of these. Therefore, the compositions for the manufacture of an optional additional functional layer as well as the composition of the generated additional functional layer can consist essentially of the above mentioned substances if desired.

The compositions and other properties of more than one additional functional layer within one casing are independent one from the other, although they may be partially or totally identical.

In order to obtain casings with good printability, polyamides (C) or polyethylene terephthalate (E) can be used as materials for the functional additional layer. Especially the use of polyethylene terephthalate results in high gloss.

The wall thickness of a functional additional layer showing good printability can be in a range of from 3 to 40 µm.

Layers and the Order in which they are Arranged if Desired

If any layer except for an optional adhesive layer should contain at least one adhesion promoter (i.e. a substance having adhesive properties), the content of the at least one adhesion promoter in this layer is preferably up to 50% by weight, more preferred up to 40 by weight, often up to 30 or 20% by weight, sometimes up to 10% by weight. Suitable adhesion promoters include preferably organic polymeric materials of adhesive behavior.

In some embodiments, the at least one layer having a barrier effect for water vapor and/or oxygen contains at least one adhesion promoter which may be present in an amount as mentioned above. In some embodiments, it is preferred that the at least one layer having a barrier effect for water vapor and/or oxygen which layer comprises a content of at least one adhesion promoter is in direct contact to the at least one porous inner layer, which means that there is no adhesive layer between the at least one layer having a barrier effect for water vapor and/or oxygen and the at least one porous inner layer.

In one preferred embodiment the at least one layer having a barrier effect for oxygen is present in the food casing of the present invention. If the food casing of the invention has a barrier effect for oxygen and perhaps even additionally for some other gases, the encased food may be preserved for a longer time.

In one further preferred embodiment the food casing according to the invention comprises at least one layer with a barrier effect for oxygen and at least one layer with a barrier effect for water vapor, wherein in some embodiments both of these effects may occur in the same layer(s). In some embodiments, especially the at least one layer having a barrier effect for water vapor or the optional adhesive layer (HV) or any combination thereof may show a barrier effect for oxygen.

Optionally any one of the barrier layers having a water vapor and/or oxygen barrier effect, the adhesive layer(s), the porous inner layer(s) and the additional functional layer(s) can comprise hydrophilic substances so that the water vapor transmission rate increases if a drying of the enclosed foodstuff is desired. As such hydrophilic substances a polyetherester copolymer, polyvinylalcohol, or polyesteramide, homopolymers and/or copolymers of vinylpyrrolidone, alkyloxazoline, alkylene glycols, acrylamide, alkylene oxides, acrylic acid, metacrylic acid, maleic anhydride, vinyl alcohol ethers, vinyl alcohol esters, and cellulose ethers or blends thereof can be used. Especially, polyvinyl alcohol having a saponification degree in the range of from 70 to 100 is preferably used.

The casings according to the invention can further contain additional processing aids like anti-blocking agents, slip agents, stabilizers and/or anti-statics. Their content in the composition is commonly in the range of 0.01 to 5 weight-%, based on the weight of the casing.

The multilayered coextruded thermoplastic food casing according to the invention may consist essentially of a plastic film which comprises 2, 3, 4, 5, 6, 7, 8, 9, 10, 11, 12 or more than 12 layers. Said at least one porous inner layer is able to transfer the at least one transferable functional additive from at least one porous inner layer to the food. Preferably, the food casing has at least one layer which has a barrier effect for oxygen gas an/or for water vapor or even for both. There may be even 2, 3, 4 or even more than 4 layers having a barrier effect for water vapor and/or oxygen.

According to the invention the food casing of the present invention consists of at least 2 layers (one porous inner layer and one barrier layer), but can have even 10 or more layers. Many different multilayer structures are possible. More preferred, a casing according to the invention comprises two, three, four, five or seven layers, even more preferred five or seven layers as shown below. The following abbreviations in the denomination of the layer-types are used:

mcL: porous inner layer
BL: Bulk Layer with barrier effect, adhesive effect and/or additional function Where necessary, the following extensions are being used to describe material-subtypes:
A: optional adhesive material
B: material having a water vapor barrier effect, for example a material formed of polyolefin
C: material having a water vapor barrier effect, for example a material formed of polyamide
D: optional material having an oxygen barrier effect
E: optional polyethylene terephthalate material The letters can be followed by numbers, enumerating layers of the same material-(sub)type, whose composition may be different, but it can also be the same composition for 2 or more layers of the same material-(sub)type.

The general structure of the casing according to the invention is from inside to outside:
mcL/ . . . /BL/ . . .
where the porous inner layer mcL has a higher water vapor transmission than the bulk layer BL, and
mcL/ . . . /BL/ . . . /mcL
with the outermost layer optionally being microcellular if the casing has at least 3 layers.

The bulk layer BL can have adhesive properties (subtype A), water vapor barrier properties (subtypes A, B and C), oxygen barrier properties (C- and D-layers) and/or optimized printing properties (C- and E-layers) as needed in the application of the casing.

Consequently preferred structures are as follows, but they are not limited to those listed:
2 layers: mcL-B/BL-B
  mcL-A/BL-C
  mcL-C/BL-C
3 layers: mcL-B/BL-B/mcL-B
  mcL-B/BL-A/mcL-B
  mcL-B/BL-A/BL-B
  mcL-B/BL-A/BL-C
  mcL-A/BL-C1/BL-C2
  mcL-C/BL-A/BL-C
  mcL-C/BL-A/mcL-B
  mcL-C/BL-C/mcL-C
4 layers: mcL-B/BL-B/BL-A/BL-C
  mcL-B1/mcL-B2/BL-A/BL-C
  mcL-B/mcL-A/BL-C/mcL-C
  mcL-C/BL-C/mcl-C/BL-C
  mcL-C/BL-C/BL-D/BL-C
5 layers: mcL-B/BL-B/BL-A1/BL-C/BL-A2
  mcL-B/BL-B/BL-A/BL-C/mcL-C
  mcL-B/BL-B/BL-A/BL-C/mcL-A
  mcL-B/BL-A/BL-B/BL-A/BL-C
  mcL-B/BL-A/BL-C1/BL-D/BL-C2
  mcL-C/BL-C1/BL-A1/BL-C1/BL-C2
  mcL-C/mcL-A/BL-B/BL-A/BL-C
  mcL-C1/mcL-C2/BL-C1/BL-A/BL-C2
  mcL-C1/BL-C1/BL-A/BL-C2/mcL-C2
  mcL-C/BL-C1/BL-C2/BL-A/mcL-B
6 layers: mcL-B/BL-B/BL-A/BL-C1/BL-D/BL-C2
  mcL-B1/mcL-B2/BL-A/BL-C1/BL-D/BL-C2
  mcL-B1/BL-B/BL-A1/BL-C/BL-A2/mcL-B2
  mcL-B1/BL-B/BL-A1/BL-C/BL-A2/BL-E 7 layers: mcL-B1/mcL-B2/BL-B/BL-A1/BL-C/BL-D/BL-C2
mcL-C/BL-A1/BL-C1/BL-D/BL-C2/BL-A2/BL-E
8 layers: mcL-B/BL-B/BL-A1/BL-C1/BL-D/BL-C2/BL-A2/BL-E
mcL-C/BL-C/BL-A1/BL-C1/BL-D/BL-C2/BL-A2/BL-E
mcL-B1/BL-B/BL-A1/BL-C1/BL-D/BL-C2/BL-A2/mcL-B2
9 layers: mcL-C/BL-A1/BL-B/BL-A2/BL-C1/BL-D/BL-C2/BL-A3/BL-E
mcL-C/mcL-A/BL-B/BL-A1/BL-C1/BL-D/BL-C2/BL-A2/BL-E Especially if the at least one bulk layer BL comprises only compositions based on polyamides (BL-C) and other hydrophilic thermoplastic polymers or if a microcellular layer is sandwiched between bulk layers predominantly consisting of polyamides (BL-C), the casing can be permeable to water vapor without allowing the substances absorbed into the microcellular layer(s) mcL to be migrating to the outside of the casing, contaminating people or machinery during handling and processing. Obviously, with the number of layers, the possible combinations increases, and thus the listed structures can only give a small selection of possible structures.

In a more preferred embodiment the following structures are preferred:

5 layers: Porous inner layer/bulk layer having barrier effect/adhesive layer/bulk layer having barrier effect/adhesive layer or porous layer or bulk layer having barrier effect,
Porous inner layer/adhesive layer/bulk layer having barrier effect/adhesive layer or bulk layer having barrier effect/bulk layer having barrier effect,
Porous inner layer/porous layer optionally having adhesive effect/bulk layer having barrier effect/adhesive layer/bulk layer having barrier effect,
Porous inner layer/bulk layer having barrier effect/adhesive layer or bulk layer having barrier effect/adhesive layer or bulk layer having barrier effect/porous layer, such as
mcL-B/BL-B/BL-A1/BL-C/BL-A2
mcL-B/BL-B/BL-A/BL-C/mcL-C
mcL-B/BL-B/BL-A/BL-C/mcL-A
mcL-B/BL-A/BL-B/BL-A/BL-C
mcL-B/BL-A/BL-C1/BL-D/BL-C2
mcL-C/BL-C1/BL-A1/BL-C1/BL-C2
mcL-C/mcL-A/BL-B/BL-A/BL-C
mcL-C1/mcL-C2/BL-C1/BL-A/BL-C2
mcL-C1/BL-C1/BL-A/BL-C2/mcL-C2
mcL-C/BL-C1/BL-C2/BL-A/mcL-B
and
7 layers: Porous inner layer/porous layer optionally having adhesive effect/bulk layer having barrier effect/bulk layer having adhesive effect/bulk layer having barrier effect/bulk layer having barrier effect/bulk layer having barrier effect,
Porous inner layer/adhesive layer/bulk layer having barrier effect/bulk layer having barrier effect/bulk layer having barrier effect/bulk layer having adhesive effect/bulk layer having functional effect, such as
mcL-B1/mcL-B2/BL-B/BL-A1/BL-C/BL-D/BL-C2
mcL-C/BL-A1/BL-C1/BL-D/BL-C2/BL-A2/BL-E.

Process for Manufacturing the Food Casing According to the Present Invention

As outlined above, the present invention further provides a method for producing a multilayered coextruded thermoplastic food casing as defined above said food casing comprising at least one porous inner layer; at least one layer having a barrier effect for water vapor and/or oxygen; at least one adhesive layer, said adhesive layer optionally being the same as or different from said at least one porous inner layer and/or said layer having a barrier effect for water vapor and/or oxygen; said method comprising a step of subjecting a combination of a first polymer composition comprising a polymer and a supercritical pore-forming agent, and at least one additional second polymer composition to a co-extrusion process, wherein said first polymer composition comprising a polymer and a supercritical pore-forming agent, after co-extrusion forms said at least one porous inner layer.

Usually, the method for producing a multilayered thermoplastic food casing comprises a step of preparing at least two different thermoplastic compositions each comprising at least one organic polymeric material so as to generate at least two different layers by coextrusion that will be united at high temperature to form a multilayered thermoplastic food casing.

Furthermore, the present invention provides a method for producing a multilayered coextruded thermoplastic food casing as defined above said food casing comprising at least one inner layer having a barrier effect for water vapor and/or oxygen; at least one porous outer layer; at least one adhesive layer, said adhesive layer optionally being the same as or different from said at least one porous outer layer and/or said layer having a barrier effect for water vapor and/or oxygen; said method comprising a step of subjecting a combination of a first polymer composition comprising a polymer and a supercritical pore-forming agent, and at least one additional second polymer composition to a co-extrusion process, wherein said first polymer composition comprising a polymer and a supercritical pore-forming agent, after co-extrusion forms said at least one porous outer layer.

According to the present invention the porous structure of the porous inner or outer layer(s) is formed by a supercritical pore-forming agent introduced into the molten polymer or polymer mixture in the extruder designated to form the porous inner layer(s), in such a way that a solution is generated. In contrast, in the food casings known in the art the hollow spaces or interstices of the porous inner layer(s) are formed by using solid fillers or hydrophobic oils or oily substances. One of the benefits of using a supercritical pore-forming agent is that according to the present invention no non-supercritical liquid pore-forming agent will remain in the porous inner layer(s) after extrusion of the polymer mixture. Furthermore, the pore structure of the porous inner or outer layer(s) such as pore size, porosity level and so on, can be controlled much more exactly according to the present invention.

Any of a wide variety of supercritical fluid pore-forming agents such as supercritical nitrogen, supercritical oxygen, supercritical helium or supercritical carbon dioxide, more preferably supercritical carbon dioxide or supercritical nitrogen, even more preferably supercritical nitrogen may be used as the supercritical pore-forming agent to be used according to the present invention. Said supercritical pore-forming agent is introduced into the extruder and made to form rapidly a single-phase solution with the polymeric material by injecting said pore-forming agent as a supercritical fluid.

Usually, the supercritical pore-forming agent is introduced into polymeric material which will form the porous inner or outer layer(s), via a port of an extruder in an amount of 0.001 to 10 weight-%, based on the weight of the polymer mixture forming said inner or outer porous layer(s).

Although said port of the extruder can be located at any of a variety of locations along the barrel of the extruder, according to a preferred embodiment it is located just upstream from a mixing section where the screw of the extruder includes highly-broken flights and at a location of the screw where the screw includes unbroken flights. In other words, in a preferred embodiment the port for introducing pore-forming agent into the polymeric material is located at a region upstream from a mixing section where the screw includes highly-broken flights, more preferably at a distance upstream of the mixing section of no more than about 4 full flights, more preferably no more than about 2 full flights, or no more than 1 full flight. Positioned as such, injected pore-forming agent is very rapidly and evenly mixed into a fluid polymeric stream to quickly produce a single-phase solution of the polymeric material and the pore-forming agent.

In a preferred embodiment said port is a multi-hole port including a plurality of orifices connecting the pore-forming agent with the extruder barrel. As shown, in a preferred embodiment a plurality of ports is provided about the extruder barrel at various positions radially and can be in alignment longitudinally with each other. For example, a plurality of ports can be placed at the 12 o'clock, 3 o'clock, 6 o'clock, and 9 o'clock positions about the extruder barrel, each including multiple orifices. In this manner, the extrusion apparatus used according to the present invention can have at least about 10, preferably at least about 40, more preferably at least about 100, more preferably at least about 300, more preferably at least about 500, and more preferably still at least about 700 pore-forming agent orifices in fluid communication with the extruder barrel, fluidly connecting the barrel with a source of pore-forming agent. Also in preferred embodiments is an arrangement in which the pore-forming agent orifice or orifices are positioned along the extruder barrel at a location where, when a preferred screw is mounted in the barrel, the orifice or orifices are adjacent full, unbroken flights. In this manner, as the screw rotates, each flight, passes, or "wipes" each orifice periodically. This wiping increases rapid mixing of pore-forming agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of pore-forming agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices are positioned at a distance of from about 15 to about 30 barrel diameters from the beginning of the screw at an upstream end.

Optionally, as outlined above, the composition forming the at least one porous inner or outer layer may additionally comprise a filler as defined above.

Before the coextrusion the thermoplastic compositions usually are softened or even after the softening at least partially molten and lead through an arrangement of extruders being connected to heated annular multilayer die having at least as many ring-like channels as needed for the different heated compositions. When leaving the die the extruded food casing solidifies on cooling to a primary multilayered casing comprising at least two layers well adhering to each other.

Optionally, the coextruded food casing may be monoaxially or biaxially stretched e.g. with the aid of an air-cushion between two squeezing rollers. In order to adjust the back-shrinkage of the stretched film the process may include a consecutive heat setting step. The stretching results in a high orientation of the multilayered thermoplastic film. The orientation of the molecules respectively of different crystallographic domains of the thermoplastic materials is primarily in one of the directions of the stretching. During this stretching, the number and/or the volume of the pores may increase.

During the co-extrusion and during the stretching, the plastic material of the casing is oriented and the casing gains a back-shrinkage (which may be gradually reduced by heat setting) so that the casing is in a tight and well-rounded condition even after use by a "fill-and-cook-in" procedure. Because of the presence of at least one layer within the multilayered coextruded casing showing a barrier effect, especially for sausages, the exudation of meat juice originating from the food through the casing wall is efficiently prevented.

The smaller the number of layers in the casing according to the invention is, the more care has to be taken that there is at least one layer generating sufficient strength and flexibility. This may cause that the at least one layer having a barrier effect for water vapor and/or oxygen has no or nearly no pores and may perhaps be thicker. As the at least one porous inner layer is weakened because of its pores and as its strength is strongly reduced if there are big pores or big well connected interstices or both, a good adhesion of the at least one porous inner layer to the adjacent outer layer and a sufficient strength of at least one of the other layers is of importance.

The food casing according to the present invention can be formed by a multi-layer head into which the melt of the extruders is supplied according to the desired ratio of the layer thicknesses. Any extruder responsible for the at least one porous inner or outer layer is equipped with or connected to the dosing device for introducing the supercritical pore-forming agent into the melt.

Later on, the stretched multilayered film may pass through a further heating zone to generate a heat-setting, wherein the casing is usually stabilized by an entrapped air-bubble. In such way, the potential of thermal shrinkage may be reduced to low values as needed for practical application as food casing that is typically in the range from 5 to 20% in longitudinal respectively in lateral direction, as measured at a temperature of 80 deg. C.

In a preferred application the food casing of the present invention which shall take up the at least one transferable functional additive may be transferred through two squeezing rollers arranged one after the other, where there may be located a bubble of liquid containing the composition containing the at least one transferable functional additive which is preferably a solution or suspension or both. The at least one porous inner layer typically has a very high open porosity which provides for an extraordinarily high absorption amount. Within few seconds, a sufficient amount of the functional food additive is taken up by capillary forces through the openings of the interconnected porosity. Typically, a separate drying is not necessary if the dosage is adequate.

The final food casings according to the invention usually have a total wall thickness in the range of from 25 to 400 µm, preferably in the range of 40 to 300 µm, more preferably in the range of 50 to 200 µm.

If the food casing shall be sealed to bags, the at least one porous inner layer and optionally adjacent barrier layers can be made heat-sealable, which means that the melting temperature of these layers is lower than that of the at least one outer layer. This structure allows to set the sealing temperature in such a way that the at least one outer layer is not sealed through, while the inner layers are being sealed together. It is advisable to seal all porous inner layers, which are used for absorbance of a food substance so that all pores in the sealing area are closed during the sealing.

Based on the above properties a coated or impregnated food casing according to the invention can be stuffed with foodstuff, especially with meat products like sausage or ham emulsion or processed cheese or fish products, and transfer the colouring or flavouring food substances onto the foodstuff during cooking and/or storage.

The invention will now be described using examples of embodiments and comparative examples, but without limiting the scope of the invention.

EXAMPLES

The following raw materials were used in the production of the examples:
- A1: modified polyolefin: Admer NF 518E by Mitsui Chemicals
- A2: modified polyolefin: Bynel 50E571 by Du Pont
- B: polyolefin: Flexirene CL 10U by Polimeri Europa
- C1: polyamide 6: Akulon F136C by DSM
- C2: polyamide 6: Grilon FG 34 NL Natur 6023 by EMS
- C3: amorphous polyamide: Grivory G21 by EMS
- NA: filler masterbatch: LLDPE-based masterbatch with 40% talc by Performance Compounding Inc.

When the layer was to become porous, nitrogen (Nitrogen 4.0 (99.99%) by Linde Gas a.s.) was used as a supercritical pore-forming agent.

The Compound A, which is used in Comparative Example 2, was compounded using the following raw materials:
- Soybean oil refined IP Ph. Eur. 8.0 by Gustav Heess GmbH
- Glycerine (Food Grade) 99.5% Distilled Glycerine/Pharma grade by Preol, a.s.
- Silica Hi-Sil ABS by PPG Industries
- Polypropylene Moplen RP340H by LyondellBasell.

The oil and the glycerine were mixed in a bowl at a temperature of 50° C. Then the mixture was entered into the silica and mixed for 10 min until the mixture had turned into floatable crumbles. These crumbles and the polypropylene were continually dosed in the desired ratio via a gravimetric dosing system into the funnel of a compounder (VSK 25 by Werner&Pfleiderer). The compounder had a screw with diameter 25 mm and a length to diameter ratio of 50. The compound was homogenized at 200 rpm at temperatures of 200 to 220° C. and exited the compounder through a 2×3.5 mm diameter strand die with an output of 15 kg/h. The 2 strands were cooled down in a water bath and chopped into granules.

Extrusion

Examples according to the invention 1 and 2 and the comparative example 1 were produced on a 5-layer double-bubble line. The dosing system for the injection of the supercritical pore-forming agent was linked to the extruder feeding the porous inner layer. The tubular casings were made by plasticizing and homogenizing the raw material described in table 1 in the respective extruder having melt temperatures of around 250° C. in the case of polyamide based layers and around 230° C. in the case of polyolefin-based layers. The 5 melt-pump-fed melt-flows were co-extruded into a primary tube by using a 5-layer head in which the individual flows were joined in quantitative ratios according to the desired wall thickness of the individual layers and extruded through an annular die. The primary tube is quickly cooled down to 10 to 20° C. and then pre-heated by hot water of 70-80° C., bi-axially oriented, thermally fixed, flattened and reeled. The primary tube was stretched bi-axially by a factor of 2.55 in machine direction (MD) and by a factor of 3.21 in transversal direction (TD).

For the production of comparative example 1, the dosing system was turned off and the orientation factor in transversal direction increased to 3.40. The casings were annealed to have 15 to 20% shrinkage (measured after 1 min in water of 80° C.).

The comparative example 2 was produced on a 5-layer double-bubble line without usage of the dosing system for the injection of the supercritical pore-forming agent. The tubular casings were made by plasticizing and homogenizing the raw material described in table 1 in the respective extruder having melt temperatures of around 250° C. in the case of polyamide based layers and around 230° C. in the case of polyolefin-based layers. The 5 melt-pump-fed melt-flows were co-extruded into a primary tube by using a 5-layer head in which the individual flows were joined in quantitative ratios according to the desired wall thickness of the individual layers and extruded through an annular die. The primary tube is quickly cooled down to 10 to 20° C. and then pre-heated by hot air to a temperature of 70-80° C., bi-axially oriented, thermally fixed, flattened and reeled. The primary tube was stretched bi-axially by a factor of 2.61 in machine direction (MD) and by a factor of 3.54 in transversal direction (TD), leading to an area orientation ratio of 9.24. The casing was annealed to have 12 to 14% shrinkage (measured after 1 min in water of 80° C.).

The comparative example 2 having compound A as porous inner layer, was prepared based on the teaching given in example 1 of EP1 911 352.

The layer thicknesses of barrier layers in the final casings were evaluated by light microscopy and are given in table 1. Knowing the extruded volume for every individual layer via the rotations per minute of its melt pump, the layer thickness of the inner layer of examples 1 and 2 as well as comparative example C2 when non-porous is calculated dividing the thickness of all barrier layers by their extruded volume per minute and multiplying by the extruded volume of the inner layer. This thickness of the inner layer when non-porous is also given in table 1. The mean wall thickness as measured by manual thickness gauge and the flat width of the examples are given in table 2.

The porosity of examples 1 and 2 as well as comparative example C2 is calculated using the ratio of the thickness of the inner layer when non-porous (table 1) to the layer thickness of the porous inner layer, resulting from the difference between mean wall thickness (table 2) and the sum of all thicknesses of the barrier layers (table 1).

Table 1 gives an overview of the examples prepared.

TABLE 1

STRUCTURES OF THE EXAMPLES

| Example | Inner layer | Layer 2 | Core | Layer 4 | Outermost layer |
|---|---|---|---|---|---|
| 1 | 25.6 µm mcL-B incl. 27% NA1 and 6.356 g/h $N_2$ | 10 µm BL-A1 | 16 µm BL-C1 incl. 5% C3 | 8 µm BL-A1 | 31 µm BL-C1 incl. 5% C3 |
| 2 | 28.5 µm mcL-B incl. 27% NA1 and 2.497 g/h $N_2$ | 10 µm BL-A1 | 16 µm BL-C1 incl. 5% C3 | 11 µm BL-A1 | 34 µm BL-C1 incl. 5% C3 |
| Compar. 1 | 16 µm BL-B | 2 µm BL-A1 | 13 µm BL-C1 incl. 5% C3 | 2 µm BL-A1 | 14 µm BL-C1 incl. 5% C3 |
| Compar. 2 | 18.0 µm Compound A | 4 µm BL-A2 | 12 µm BL-C2 incl. 20% C3 | 6 µm BL-C2 incl. 20% C3 | 22 µm BL-C2 incl. 20% C3 |

Sample Evaluation

The examples were characterized using the following evaluation methods.

Water Vapor Transmission Rate (WVTR)

The WVTR was determined at 23° C./85% dynamic relative humidity according to ASTM E 398-03 using a Permatran W 1/50 G.

Absorbance Capacity

The absorbance capacity was evaluated by measuring the weight before and after impregnation with liquid smoke (smoke type Hickory Teepak Alkalized Smoke by Kerry Ingredients & Flavours). The impregnation took place by moving bubble between vertically placed squeezing reel pairs, allowing a contact time of 20 s. Pressure of the upper squeezing reel pair was 2 bar. A defined length of non-impregnated and impregnated sample material was weighed. The absorbance capacity in $g/m^2$ was calculated as difference of the two weight measurements per surface area of the casing.

Optical and Haptical Properties

The optics of the final sausage was evaluated by means of visual evaluation of the cooled sausage before peeling, qualitatively describing the surface in terms of rough/glossy/matt appearance. In addition the inside of the casing was evaluated accordingly.

Effectiveness of the Substance Transfer

Bologna-type sausages were prepared by stuffing meat emulsion into the impregnated sample material, cooking the sausages in a cooking chamber at 76° C. for 2.5 hours and cooling them down over night to 3° C. in a cooling chamber. The effectiveness of the substance transfer was evaluated by measuring the L-value on different locations of the peeled sausage and calculating a mean value. The L-value was measured with an X-rite SP68 Sphere-Spectrophotometer.

Table 2 shows the results of the evaluated properties.

geneous, very weak smoke transfer, leaving the sausage practically uncoloured. Also the sample of comparative example 2, although having some porosity, only shows low absorption of the liquid smoke and therefore a weak transfer of smoke to the foodstuff.

On the contrary, the examples according to the invention show a good to excellent absorption of liquids, if the porous inner layer is the innermost layer (examples 1 and 2). Depending on the desired porosity and the raw materials used, the absorbance capacity can be defined in a wide range. The resulting smoke transfer of the examples 1 and 2 is very effective and leaves the sausage brown to dark brown corresponding to the measured absorption capacity.

All the sausages have glossy outside appearance and a slick touch. In the case of the comparative examples also the inner layer is slick. The surface has no roughness and looks and feels artificial. Only the examples 1 and 2 have a microcellular inner structure, which has a rough touch. If the porous inner layer was applied to the outside, the sausage had a rough touch and matt/natural optics.

If a core layer is microcellular, the water vapor transmission rate increases drastically in comparison to a casing which has the same wall thickness of bulk material, as can be seen by comparing the highly different wall thickness of example 2 and comparative example 2, which have a similar water vapor transmission rate. The combination of a microcellular core-layer with a microcellular inner layer allows creating a significant drying capability. As described above, alternatively hydrophilic substances can be incorporated into the barrier layers to increase the water transmission of the casing according to the invention. In the opinion of the present inventors it can be assumed that the transmission through a casing with a given volume content of a hydrophilic substance is lower than the transmission through a casing having the same volume content of microcellular porosity.

TABLE 2

EXAMPLE EVALUATION

| Example | Flat Width in mm | Mean Thickness in µm | Porosity in % | WVTR in $g/m^2d$ | Absorbance in $g/m^2$ | Internal optics/haptics | Mean L-value |
|---|---|---|---|---|---|---|---|
| 1 | 87 | 186.9 | 79 | 5.4 | 66 | Matt/rough | 44 |
| 2 | 90 | 165.4 | 70 | 4.4 | 44 | Matt/rough | 51 |
| Compar. 1 | 98 | 47.4 | No porosity | 4.0 | 3 | Glossy/slick | 76 |
| Compar. 2 | 171 | 73.6 | 39 | 8.1 | 7 | Matt/slick | 73 |

The sample of comparative example 1 does not have a porous inner layer. Therefore comparative sample 1 shows on the inside only very poor absorption of liquid smoke, which is present on the surface in droplets, and an inhomo- The examples according to the invention could be stuffed and cooked without breakages. The performance regarding calibre consistency, absence of wrinkles, and peeling was very good. Surprisingly the addition of the supercritical pore-forming agent and the resulting microcellular porosity was well extrudable and the examples according to the invention showed a homogeneous porosity and intense transfer of the food substance, in contrast to the unsatisfactory transfer of the Comparative examples. Comparative example 2 delaminated upon the attempt to peel in transversal direction, while the examples according to the invention did not.

Summarizing the results, the examples show that only the casings according to the invention as represented by the examples 1 and 2 show homogeneous microcellular layers with good absorption and effective smoke transfer. Furthermore the outermost layer can be produced with high gloss or natural appearance as the application requests.

The invention claimed is:

1. A multilayered coextruded thermoplastic food casing comprising:
    at least one porous inner layer;
    at least one layer having a barrier effect for water vapor and/or oxygen;
    at least one adhesive layer, said adhesive layer optionally being the same as or different from said at least one porous inner layer and/or said one layer having a barrier effect for water vapor and/or oxygen;
    wherein the porosity of said at least one porous inner layer has been generated by (co)extruding a first polymer composition comprising a polymer and a supercritical pore-forming agent,
    wherein the porosity of the sum of said at least one porous inner layer is in a range of from 5 to 90% by volume, said at least one porous inner layer has a porosity comprising pores having a pore diameter of from 0.01 to 2000 μm, such that at least one of said at least one porous inner layer(s) is able to absorb, retain, desorb and to transfer at least one transferable functional additive from said at least one porous inner layer to food encased in said casing.

2. A food casing according to claim 1, wherein the supercritical pore-forming agent is selected from the group consisting of supercritical nitrogen and supercritical carbon dioxide.

3. A food casing according to claim 1, wherein at least one of the at least one transferable functional additive is contained in an innermost porous inner layer of said at least one porous inner layer which has direct contact to food when food is encased in the casing.

4. A food casing according to claim 1, wherein the at least one porous inner layer comprises pore channels having diameters in a range of from 0.01 to 2000 μm.

5. A food casing according to claim 1, wherein the food casing further comprises at least one layer selected from the group consisting of a layer comprising a (co)polyamide, a layer comprising a polyolefin, an oxygen barrier layer and an adhesive layer.

6. A food casing according to claim 1, wherein at least one of the at least one adhesive layer is in direct contact to a layer having an oxygen barrier effect on at least one side thereof.

7. A food casing according to claim 1, wherein said at least one porous inner layer further comprises a hydrophilic substance.

8. A food casing according to claim 1, wherein a layer comprising at least one adhesion promoter is in direct contact to said at least one porous inner layer.

9. A food casing according to claim 1, wherein the food casing is free of any non-supercritical liquid pore-forming agent.

10. A food casing according to claim 1, wherein the first polymer composition forming the at least one porous inner layer is a polymer composition consisting of a polymer, a supercritical pore-forming agent and optionally a filler and/or optionally a nucleating agent.

11. A food casing according to claim 1, wherein the at least one porous inner layer consists of a polymer and optionally a filler and/or optionally a nucleating agent.

12. A food casing according to claim 1, further comprising an outer layer which is a functional layer providing optical properties and/or haptical properties to the food casing.

13. A food casing according to claim 3, wherein said transferable functional additive comprises a colorant, a fragrance and/or a flavorant.

14. A multilayered coextruded thermoplastic food casing comprising:
    at least one inner layer having a barrier effect for water vapor and/or oxygen;
    at least one porous outer layer;
    at least one adhesive layer, said adhesive layer optionally being the same as or different from said at least one porous outer layer and/or said layer having a barrier effect for water vapor and/or oxygen;
    wherein the porosity of said at least one porous outer layer has been generated by (co)extruding a first polymer composition comprising a polymer and a supercritical pore-forming agent, wherein the porosity of the sum of said at least one porous outer layer is in a range of from 5 to 90% by volume, said at least one porous outer layer has a porosity comprising pores having a pore diameter of from 0.01 to 2000 μm.

15. A food casing according to claim 14, further comprising an outermost layer which is a functional layer providing optical properties and/or haptical properties to the food casing.

16. A food product encased in a casing according to claim 1.

17. A method for producing a multilayered coextruded thermoplastic food casing as defined in claim 1, comprising a step of subjecting a combination of a first polymer composition comprising a polymer and a supercritical pore-forming agent, and at least one additional second polymer composition to a co-extrusion process, wherein said first polymer composition comprising a polymer and a supercritical pore-forming agent, after co-extrusion forms said at least one porous inner layer.

18. A method according to claim 17, wherein the first polymer composition which will form the at least one porous inner layer is a polymer composition consisting of a polymer, a supercritical pore-forming agent and optionally a filler and/or optionally a nucleating agent.

19. A method for producing a multilayered coextruded thermoplastic food casing as defined in claim 14, comprising a step of subjecting a combination of a first polymer composition comprising a polymer and a supercritical pore-forming agent, and at least one additional second polymer composition to a co-extrusion process, wherein said first polymer composition comprising a polymer and a supercritical pore-forming agent, after co-extrusion forms said at least one porous outer layer.

20. A method according to claim 19, wherein the first polymer composition which will form the at least one porous inner layer is a polymer composition consisting of a polymer, a supercritical pore-forming agent and optionally a filler and/or optionally a nucleating agent.

21. A multilayered coextruded thermoplastic food casing comprising:
- at least one porous inner layer comprising a hydrophilic substance;
- at least one layer having a barrier effect for water vapor and/or oxygen;
- at least one adhesive layer, said adhesive layer optionally being the same as or different from said at least one porous inner layer and/or said one layer having a barrier effect for water vapor and/or oxygen;
- an outer layer which is a functional layer providing optical properties and/or haptical properties to the food casing: and
- optionally at least one further layer selected from the group consisting of a layer comprising a (co)polyamide, a layer comprising a polyolefin, an oxygen barrier layer and an adhesive layer;
- wherein the porosity of said at least one porous inner layer has been generated by (co)extruding a first polymer composition comprising a polymer and a supercritical pore-forming agent,
- wherein the porosity of the sum of said at least one porous inner layer is in a range of from 5 to 90% by volume, said at least one porous inner layer has a porosity comprising pores having a pore diameter of from 0.01 to 2000 μm and/or pore channels having a diameter of from 0.01 to 2000 μm, such that at least one of said at least one porous inner layer(s) is able to absorb, retain, desorb and to transfer at least one transferable functional additive from said at least one porous inner layer to food encased in said casing.

22. A food casing according to claim 21, wherein at least one of the at least one adhesive layer is in direct contact to a layer having an oxygen barrier effect on at least one side thereof and/or a layer comprising at least one adhesion promoter in direct contact to said at least one porous inner layer.

* * * * *